(12) United States Patent
Zhou et al.

(10) Patent No.: US 11,360,737 B2
(45) Date of Patent: Jun. 14, 2022

(54) METHOD AND APPARATUS FOR PROVIDING SPEECH SERVICE

(71) Applicant: BAIDU ONLINE NETWORK TECHNOLOGY (BEIJING) CO., LTD., Beijing (CN)

(72) Inventors: Jianliang Zhou, Beijing (CN); Guanghao Shen, Beijing (CN); Ruisheng Wu, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 182 days.

(21) Appl. No.: 16/028,114

(22) Filed: Jul. 5, 2018

(65) Prior Publication Data
US 2019/0012138 A1    Jan. 10, 2019

(30) Foreign Application Priority Data
Jul. 5, 2017   (CN) .......................... 201710543537.6

(51) Int. Cl.
| G06F 3/16 | (2006.01) |
| G06F 16/242 | (2019.01) |
| G10L 15/26 | (2006.01) |
| G06N 5/04 | (2006.01) |
| G06N 20/00 | (2019.01) |

(52) U.S. Cl.
CPC ............ *G06F 3/167* (2013.01); *G06F 16/243* (2019.01); *G10L 15/26* (2013.01); *G06N 5/04* (2013.01); *G06N 20/00* (2019.01)

(58) Field of Classification Search
CPC ......... G10L 2015/223; G10L 2015/225; G10L 15/22; G06F 16/243
See application file for complete search history.

(56) References Cited

U.S. PATENT DOCUMENTS

| 6,532,446 B1 * | 3/2003 | King ....................... G10L 15/22 |
| | | 704/231 |
| 2007/0055958 A1 * | 3/2007 | Birenheide ........... G06F 11/362 |
| | | 717/124 |

(Continued)

FOREIGN PATENT DOCUMENTS

CN    106228974 A    12/2016

*Primary Examiner* — Daniel C Washburn
*Assistant Examiner* — Oluwadamilola M Ogunbiyi
(74) *Attorney, Agent, or Firm* — Lathrop GPM LLP (57) ABSTRACT

The present disclosure discloses a method and apparatus for providing a speech service. A specific embodiment of the method comprises: receiving request information sent by a device, the request information comprising first event information and speech information, the first event information used for indicating a first event occurring on the device when the device sends the request information, wherein the first event information comprises speech input event information used for instructing a user to input the speech information; generating response information comprising an operation instruction for a targeted device on the basis of the first event information and the speech information; and sending the response information to the targeted device for the targeted device to perform an operation indicated by the operation instruction. The embodiment improves the efficiency of providing a speech service.

15 Claims, 4 Drawing Sheets

(56) References Cited

U.S. PATENT DOCUMENTS

| | | | |
|---|---|---|---|
| 2008/0133812 A1* | 6/2008 | Kaiser | G06F 9/542 710/263 |
| 2008/0299954 A1* | 12/2008 | Wright | H04W 4/029 455/414.1 |
| 2009/0204410 A1* | 8/2009 | Mozer | G10L 15/30 704/275 |
| 2009/0244630 A1* | 10/2009 | Miyazaki | G06T 11/40 358/3.01 |
| 2010/0287477 A1* | 11/2010 | Maetzler | G06F 3/04842 715/733 |
| 2012/0081378 A1* | 4/2012 | Roy | G09G 5/001 345/522 |
| 2012/0136961 A1* | 5/2012 | Chen | H05B 47/175 315/129 |
| 2012/0232978 A1* | 9/2012 | Steul | H04W 4/21 705/14.25 |
| 2014/0071145 A1* | 3/2014 | Lee | G06T 1/60 345/545 |
| 2014/0343946 A1* | 11/2014 | Torok | G10L 15/30 704/270.1 |
| 2015/0112667 A1* | 4/2015 | Kozu | H04M 1/72533 704/201 |
| 2015/0153827 A1* | 6/2015 | Yun | G06F 3/038 345/156 |
| 2016/0034253 A1* | 2/2016 | Bang | H04M 1/724 715/728 |
| 2016/0094383 A1* | 3/2016 | Wang | G06F 16/951 709/221 |
| 2016/0109940 A1* | 4/2016 | Lyren | G06F 3/011 463/2 |
| 2016/0239165 A1* | 8/2016 | Chen | G06F 3/04847 |
| 2016/0291908 A1* | 10/2016 | Hermus | G06F 3/1207 |
| 2016/0301704 A1* | 10/2016 | Hassanzadeh | H04L 63/0227 |
| 2016/0322044 A1* | 11/2016 | Jung | G06F 3/017 |
| 2017/0094000 A1* | 3/2017 | Sone | H04L 67/34 |
| 2017/0168774 A1* | 6/2017 | Sugita | B60R 16/02 |
| 2018/0321991 A1* | 11/2018 | Kim | H04W 4/06 |
| 2018/0322870 A1* | 11/2018 | Lee | G10L 15/22 |
| 2018/0343134 A1* | 11/2018 | Press | H04L 65/403 |
| 2018/0367483 A1* | 12/2018 | Rodriguez | H04L 51/04 |
| 2019/0182070 A1* | 6/2019 | Yang | G10L 15/26 |
| 2019/0258370 A1* | 8/2019 | Zhong | G06F 3/0488 |
| 2019/0335020 A1* | 10/2019 | Luo | H04L 67/16 |
| 2020/0059377 A1* | 2/2020 | Ansari | H04L 65/102 |

* cited by examiner

METHOD AND APPARATUS FOR PROVIDING SPEECH SERVICE

CROSS-REFERENCE TO RELATED APPLICATIONS

This application is related to and claims priority from Chinese Application No. 201710543537.6, filed on Jul. 5, 2017 and entitled "Method and Apparatus for Providing Speech Service," the entire disclosure of which is hereby incorporated by reference.

TECHNICAL FIELD

The present disclosure relates to the field of computer technology, specifically to the field of artificial intelligence, and more specifically to a method and apparatus for providing a speech service.

BACKGROUND

With the development of the computer technology and the continuous accumulation of network data, the artificial intelligence technology develops quickly. In the field of artificial intelligence, an intelligent speech service integrating speech recognition, natural language processing and machine learning technology is more and more widely applied.

However, the existing speech service has a problem of low efficiency.

SUMMARY

An objective of the present disclosure is to provide an improved method and apparatus for providing a speech service to solve the technical problem mentioned in the foregoing Background section.

In a first aspect, the embodiment of the present disclosure provides a method for providing a speech service, the method including: receiving request information sent by a device, the request information including first event information and speech information, the first event information used for indicating a first event occurring on the device when the device sends the request information, the first event information including speech input event information used for instructing a user to input the speech information; generating response information including an operation instruction for a targeted device on the basis of the first event information and the speech information; and sending the response information to the targeted device for the targeted device to perform an operation indicated by the operation instruction.

In some embodiments, before receiving request information sent by a device, the method further includes: receiving a response channel establishing request sent by the device, wherein the response channel establishing request is used to request establishing a channel for returning response information to a terminal device and maintaining the established response channel in a connected state; and receiving second event information and second status information sent by the device, wherein the second event information is used for indicating a second event occurring on the device when the device sends the response channel establishing request, and the second status information is used for indicating a status of the second event.

In some embodiments, before receiving request information sent by a device, the method further includes: receiving a functional interface directory sent by the device, wherein the functional interface directory includes an identifier of at least one of following operation interfaces: a speech input interface, a speech output interface, a speaker control interface, an audio play control interface, an alarm clock setting interface or a screen display interface; and storing the functional interface directory and an identifier of the device sending the functional interface directory accordingly.

In some embodiments, before generating response information including an operation instruction for a targeted device on the basis of the first event information and the speech information, the method further includes: receiving a status report message sent by the device, the status report message including third event information and third status information, wherein the third event information is used for indicating a third event occurring on the device when the device sends the status report message, and the third status information is used for indicating a status of the third event.

In some embodiments, the request information further includes first status information used for indicating a status of the first event; and the generating response information including an operation instruction for a targeted device on the basis of the first event information and the speech information includes: analyzing the speech information, and determining the targeted device; determining current event information of the targeted device and current status information corresponding to the current event information based on at least one of the first event information, the second event information or the third event information; and generating the response information according to the current event information of the targeted device, the current status information, the functional interface directory and the speech information.

In some embodiments, the response information further includes to-be-played audio information, and the operation instruction includes an audio play instruction for playing the to-be-played audio information; and the sending the response information to the targeted device for the targeted device to perform an operation indicated by the operation instruction includes: sending the to-be-played audio information and the audio play instruction to the targeted device for the targeted device to call a speech output interface to play the to-be-played audio information according to the audio play instruction.

In some embodiments, the response information further includes to-be-displayed view information, and the operation instruction further includes a view drawing instruction for drawing the to-be-displayed view information, wherein the view information includes at least one of the following: an image, a webpage or a video; and the sending the response information to the targeted device for the targeted device to perform an operation indicated by the operation instruction further includes: sending the to-be-displayed view information and the view drawing instruction to the targeted device for the targeted device to call a screen display interface to draw and display the to-be-displayed view information according to the view drawing instruction.

In a second aspect, the embodiment of the present disclosure provided an apparatus for providing a speech service, the apparatus including: a first receiving unit, configured for receiving request information sent by a device, the request information including first event information and speech information, the first event information used for indicating a first event occurring on the device when the device sends the request information, the first event information including speech input event information used for instructing a user to input the speech information; a generating unit, configured for generating response information including an operation instruction for a targeted device on the basis of the first event information and the speech information; and a sending unit, configured for sending the response information to the targeted device for the targeted device to perform an operation indicated by the operation instruction.

In some embodiments, the apparatus further includes: a second receiving unit, configured for receiving a response channel establishing request sent by the device, wherein the response channel establishing request is used to request establishing a channel for returning response information to a terminal device and maintaining the established response channel in a connected state; and a third receiving unit, configured for receiving second event information and second status information sent by the device, wherein the second event information is used for indicating a second event occurring on the device when the device sends the response channel establishing request, and the second status information is used for indicating a status of the second event.

In some embodiments, the apparatus further includes: a fourth receiving unit, configured for receiving a functional interface directory sent by the device, wherein the functional interface directory includes an identifier of at least one of following operation interfaces: a speech input interface, a speech output interface, a speaker control interface, an audio play control interface, an alarm clock setting interface or a screen display interface; and a storage unit, configured for storing the functional interface directory and an identifier of the device sending the functional interface directory accordingly.

In some embodiments, the apparatus further includes: a fifth receiving unit, configured for receiving a status report message sent by the device, the status report message including third event information and third status information, wherein the third event information is used for indicating a third event occurring on the device when the device sends the status report message, and the third status information is used for indicating a status of the third event.

In some embodiments, the request information further includes first status information used for indicating a status of the first event; and the generating unit is further configured for: analyzing the speech information, and determining the targeted device; determining current event information of the targeted device and current status information corresponding to the current event information based on at least one of the first event information, the second event information or the third event information; and generating the response information according to the current event information of the targeted device, the current status information, the functional interface directory and the speech information.

In some embodiments, the response information further includes to-be-played audio information, and the operation instruction includes an audio play instruction for playing the to-be-played audio information; and the sending unit is further configured for: sending the to-be-played audio information and the audio play instruction to the targeted device for the targeted device to call a speech output interface to play the to-be-played audio information according to the audio play instruction.

In some embodiments, the response information further includes to-be-displayed view information, and the operation instruction further includes a view drawing instruction for drawing the to-be-displayed view information, wherein the view information includes at least one of the following: an image, a webpage or a video; and the sending unit is further configured for: sending the to-be-displayed view information and the view drawing instruction to the targeted device for the targeted device to call a screen display interface to draw and display the to-be-displayed view information according to the view drawing instruction.

In a third aspect, the embodiment of the present disclosure provides a server, the server including: one or more processors; and a storage, for storing one or more programs, the one or more programs, when executed by the one or more processors, cause the one or more processors to implement the method according to the first aspect.

In a fourth aspect, the embodiment of the present disclosure provides a computer readable storage medium storing a computer program, the program, when executed by a processor, implements the method according to the first aspect.

The method and apparatus for providing a speech service provided in the embodiments of the present disclosure send first event information while sending speech information to a server, so that it is convenient for the server to quickly initiate a function corresponding to the event information or generate response information corresponding to an event, thereby improving the efficiency of providing a speech service.

BRIEF DESCRIPTION OF THE DRAWINGS

Other features, objects, and advantages of the present disclosure will become more apparent by reading the detailed description about the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
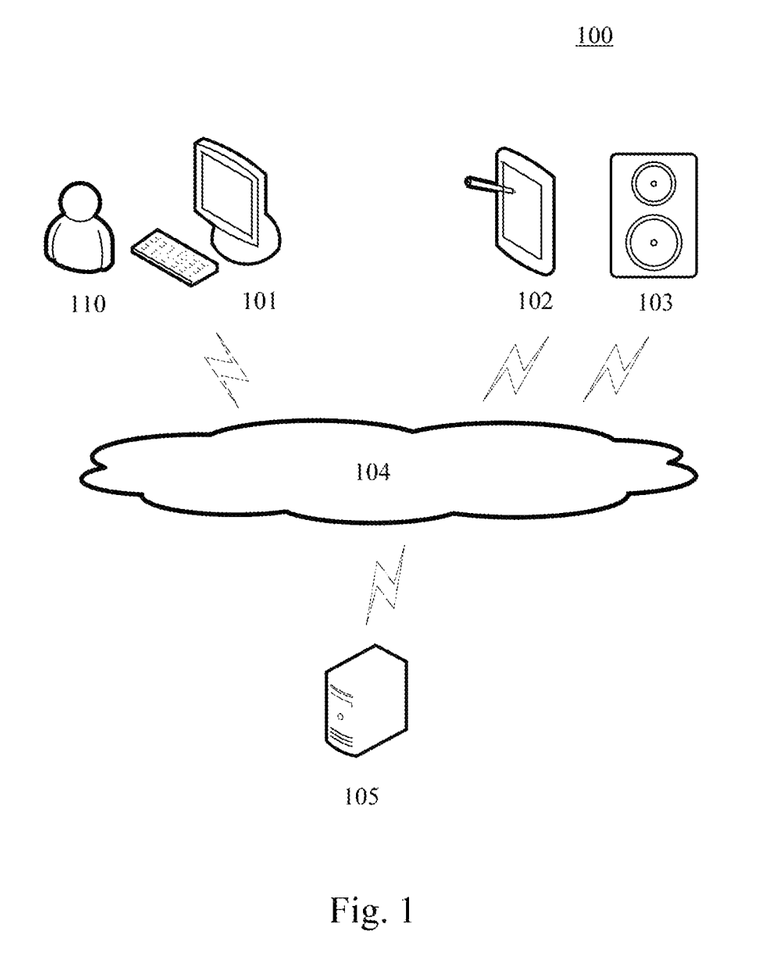
FIG. 1 is an architectural diagram of an exemplary system in which the present disclosure may be implemented.

FIG. 1 shows an exemplary system architecture 100 which may be used by a method for providing a speech service or an apparatus for providing a speech service according to the embodiments of the present disclosure.

As shown in FIG. 1, the system architecture 100 may include a terminal 101, devices 102 and 103, a network 104 and a server 105. The network 104 serves as a medium providing a communication link between the terminal 101 and the server 105, and providing a communication link between the devices 102 and 103 and the server 105. The network 104 may include various types of connections, such as wired or wireless transmission links, or optical fibers.

The user 110 may use the terminal 101 to interact with the server 105 through the network 104, in order to receive or transmit messages, etc. Various applications, such as web browser applications, speech service client applications may be installed on the terminal 101 to interact with the server 105. The terminal 101 may be various electronic devices having display screens, including but not limited to, smart phones, tablet computers, and desktop computers.

The devices 102 and 103 may interact with the server 105 through the network 104, in order to receive or transmit messages, etc. The devices 102 and 103 may be various electronic devices having audio input interfaces and audio output interfaces, such as speakers including microphones.

The server 105 may be a server providing various services, for example, a speech server that supports for webpage contents displayed on the terminal 101, and controls audio output operations performed by the devices 102 and 103. The speech server may perform processing on a request sent by the user 110 through the terminal 101 to perform a speech service operation for the devices 102 and 103, and return a processing result (for example, audio data, and an control instruction from the audio output interface) to the devices 102 and 103.

It should be noted that the method for providing a speech service according to the embodiments of the present disclosure is generally executed by the server 105. Accordingly, an apparatus for providing a speech service is generally installed on the server 105.

It should be understood that the numbers of the terminals, devices, networks and servers in FIG. 1 are merely illustrative. Any number of terminal devices, networks and servers may be provided based on the actual requirements. For example, the server may be a clustered server, including multiple servers deployed with different processes.

Figure 2:
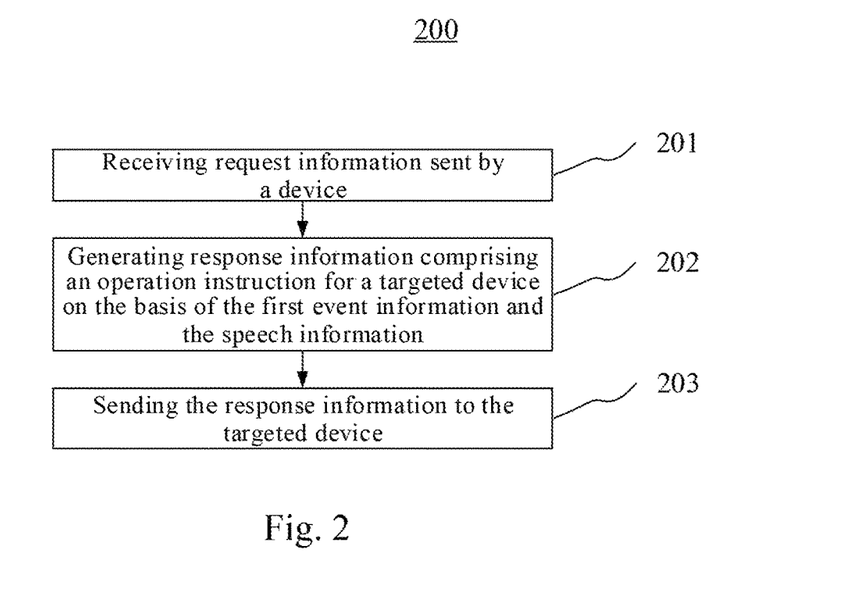
FIG. 2 is a flowchart of an embodiment of a method for providing a speech service according to the present disclosure.

Further referring to FIG. 2, FIG. 2 shows a flow 200 of an embodiment of a method for providing a speech service according to the present disclosure. The method for providing a speech service includes the following steps.

Step 201, receiving request information sent by a device.

In the present embodiment, an electronic device (the server shown in FIG. 1, for example) on which the method for providing a speech service is performed may receive request information sent by a device.

In the present embodiment, the request information may include first event information and speech information. The first event information here is used for indicating a first event occurring on the device when the device sends the request information.

In the present embodiment, the first event information may include speech input event information for indicating the event that a user inputs the speech information.

It should be noted that the event information of the device may be predetermined by the device and a server. The functions that may be realized by the device are divided into several function types. Each function type may correspond to one event type. The event information sent by the device to the server may enable the server to quickly locate the function that should be enabled according to the event information and generate an operation instruction corresponding to the event information.

For example, the server may enable the speech recognition function in response to the reception of the speech input event information. The server may, in response to the reception of a volume change event, locate the possible generation of a volume adjustment operation instruction.

In some alternative implementations of the present embodiment, the request information may further include first status information used for indicating a status of the first event.

As an example, the progress of an event may be classified, and status information indicating a possible status of the event is set in advance.

In some alternative implementations of the present embodiment, a functional interface may be set for the functions that may be realized by the device, an operation instruction corresponding to the functional interface may be set therefor, and the corresponding operation instruction may be used to call the functional interface for operation.

It should be noted that the functions that may be realized by different devices may be different, so the functional interfaces of different devices may be different.

In some alternative implementations of the present embodiment, the device may send a functional interface directory to the server after establishing a communication connection between the device and the server. The server may store the functional interface directory and an identifier of the device sending the functional interface directory accordingly.

In some alternative implementations of the present embodiment, the functional interface directory may include an identifier of at least one of following operation interfaces: a speech input interface, a speech output interface, a speaker control interface, an audio play control interface, an alarm clock setting interface or a screen display interface.

In some alternative implementations of the present embodiment, event information, status information, instruction information, and functional interface information corresponding to the function type of the device may be encapsulated according to such function type. The encapsulation result of each function type is used as an installation package. When the device installs this installation package, the device may communicate with the server and request a speech service from the server.

As an example, the device may compare an instruction sent by the server with instruction information in the installation package and call a corresponding functional interface.

In some alternative implementations of the present embodiment, a message format and a message transmission protocol may also be defined in the installation package, and the message format and the message transmission protocol are also agreed with the server in advance.

As an example, the event type may include a speech input type, a speech output type, a speaker control type, an audio play type, a play control type and an alarm clock type which are respectively corresponding to a speech input function, a speech output function, a speaker control function, an audio play function, a play control function and an alarm clock function of the device.

As an example, each event type may include a variety of specific event information. The speech input type may include speech input event information. The speech output type may include speech broadcast start event information and speech broadcast end event information. The speaker control type may include volume change event information and silent mode on/off event information. The audio play type may include audio play start event information, audio play end event information, audio play to-be-end event information, audio play error event information and audio play stop event information. The play control type may include "Play" button click event information, "Pause" button click event information, "Previous" button click event information and "Next" button click event. The alarm clock type may include alarm clock setting success event information, alarm clock setting failure event information, alarm clock deletion success event information, alarm clock deletion failure event information, alarm clock start event information, alarm clock completion event information and alarm clock stop event information.

As an example, the status information corresponding to the event information of the speech output type may be now broadcasting information and broadcasting end information. The status information corresponding to the event information of the speaker control type may be information about whether being silent or volume value information. The status information corresponding to the event information of the audio play type may be now playing information, play stop information and play completion information. The status information corresponding to the event information of the alarm clock type may be current alarm clock number information and current alarm clock event information, etc.

Step 202, generating response information including an operation instruction for a targeted device on the basis of the first event information and the speech information.

In the present embodiment, an electronic device (the server as shown in FIG. 1, for example) on which the method for providing a speech service is performed may generate response information including an operation instruction for a targeted device on the basis of the first event information and the speech information.

In the present embodiment, the server receives speech input event information and may activate a speech recognition function. Then the speech recognition function is used to analyze the speech information, analyze the intention of a user, and generate corresponding response information. It should be noted that, how to analyze the speech information and analyze the intention of the user may be realized by a person skilled in the art according to the prior art and will not be repeatedly described here.

In some alternative implementations of the present embodiment, the targeted device may be the device sending the request information or other devices. As an example, if a user inputs speech information "Turn on the speaker" on a mobile phone, the targeted device the speech information directed to is the speaker having a binding relationship with the mobile phone.

Step 203, sending the response information to the targeted device.

In the present embodiment, the electronic device (the server shown in FIG. 1, for example) on which the method for providing a speech service is performed may send the response information to the targeted device. Here, the targeted device may perform an operation indicated by the operation instruction.

In some alternative implementations of the present embodiment, the response information may further include to-be-played audio information, and the operation instruction may include an audio play instruction for playing the to-be-played audio information. In this case, the step 203 may include: sending the to-be-played audio information and the audio play instruction to the targeted device for the targeted device to call a speech output interface to play the to-be-played audio information according to the audio play instruction.

In some alternative implementations of the present embodiment, the response information may further include to-be-displayed view information, and the operation instruction may further include a view drawing instruction for drawing the to-be-displayed view information. The view information includes at least one of the following: an image, a webpage or a video. In this case, the step 203 may include: sending the to-be-displayed view information and the view drawing instruction to the targeted device for the targeted device to call a screen display interface to draw and display the to-be-displayed view information according to the view drawing instruction.

Figure 3:
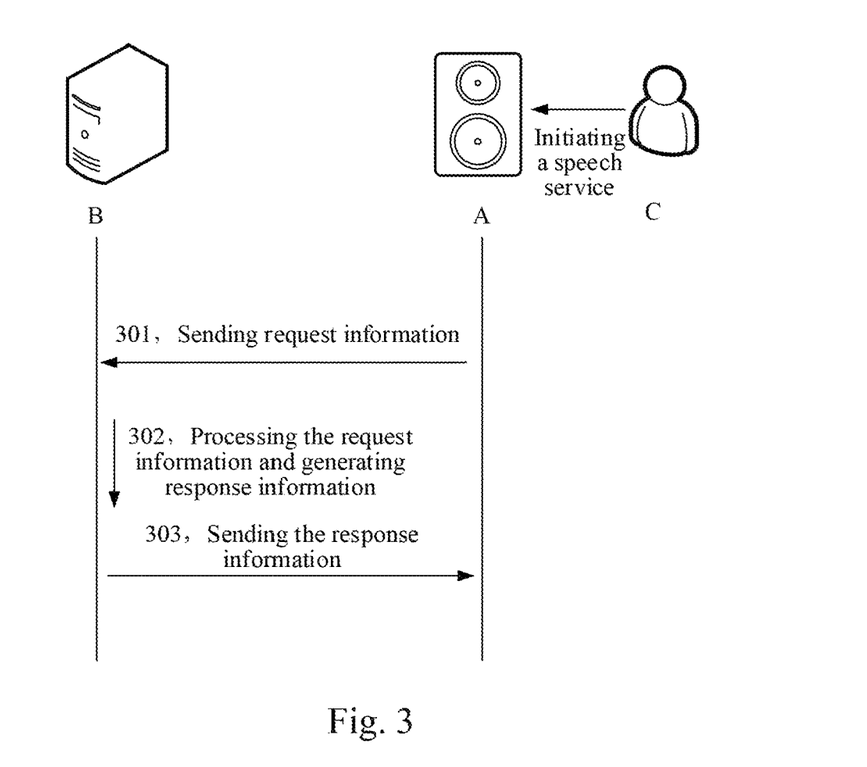
FIG. 3 is a schematic diagram of an application scenario of a method for providing a speech service according to the present disclosure.

Further referring to FIG. 3, FIG. 3 is a schematic diagram of an application scenario of a method for providing a speech service according to the present embodiment. In the application scenario as shown in FIG. 3, a user C initiates a speech service by operating a device A in a scenario as shown in FIG. 3. In response to detection of the operation by the user, the device A may send request information to a speech server B for requesting to provide a target speech service for the device A in step 301. The request information here includes first event information and speech information, the first event information is used for indicating a first event occurring on the device when the device sends the request information, the first event information includes speech input event information used for instructing the user to input the speech information. The speech server B processes the request information in step 302 to obtain response information including an operation instruction for a targeted device, and sends the response information to the device A in step 303 for the device A to perform the operation instruction.

The method provided in the embodiments of the present disclosure sends first event information while sending speech information to a server, so that it is convenient for the server to quickly initiate a function corresponding to the event information or generate response information corresponding to an event, thereby improving the efficiency of providing a speech service.

Figure 4:
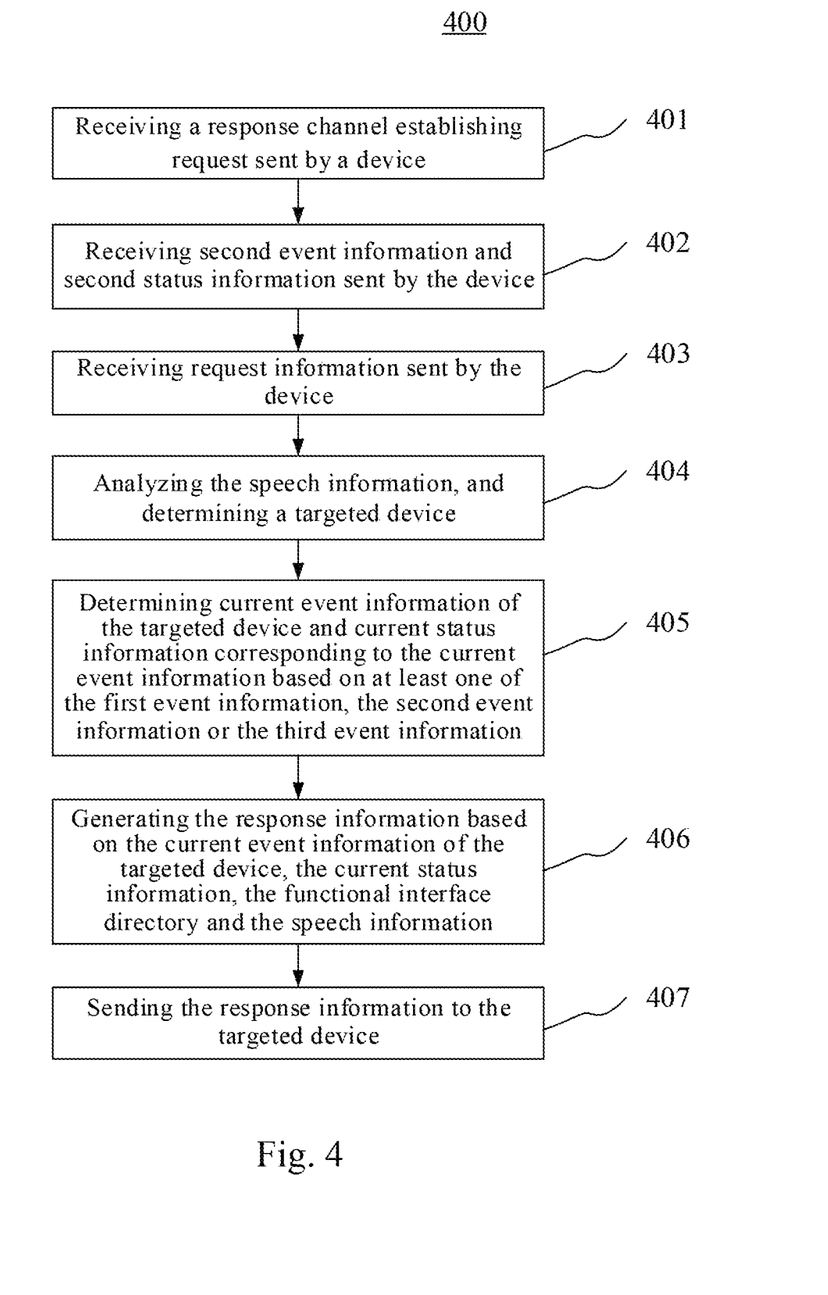
FIG. 4 is a flowchart of another embodiment of a method for providing a speech service according to the present disclosure.

Further referring to FIG. 4, a flow 400 of another embodiment of a method for providing a speech service is shown. The flow 400 of the method for providing a speech service includes the following steps.

Step 401, receiving a response channel establishing request sent by a device.

In the present embodiment, an electronic device (the server shown in FIG. 1, for example) on which the method for providing a speech service is performed may receive a response channel establishing request sent by a device. The response channel establishing request here is used to request establishing a channel for returning response information to a terminal device and maintaining the established response channel in a connected state.

In some alternative implementations of the present embodiment, the step 401 may include: establishing a physical connection between the device and a service; creating a data stream in the physical connection and sending a connection request, the data stream being a downlink message channel, that is, the channel through which the server sends a message to the device; creating a new data stream in the physical connection when the device needs to report event information, and sending a event reporting request; and closing the data stream after the request or response ends. Every predetermined period of time, a new data stream may be created in the physical connection and a connection maintaining request may be sent, the request is requested by the device for the connection between the server and the device.

Step 402, receiving second event information and second status information sent by the device.

In the present embodiment, the electronic device (the server shown in FIG. 1, for example) on which the method for providing a speech service is performed may receive second event information and second status information sent by the device, the second event information is used for indicating a second event occurring on the device when the device sends the response channel establishing request, and the second status information is used for indicating a status of the second event.

In the present embodiment, the server may further receive a functional interface directory sent by the device, the functional interface directory includes an identifier of at least one of following operation interfaces: a speech input interface, a speech output interface, a speaker control interface, an audio play control interface, an alarm clock setting interface or a screen display interface; and store the functional interface directory and an identifier of the device sending the functional interface directory accordingly.

Step 403, receiving request information sent by the device.

In the present embodiment, the electronic device (the server shown in FIG. 1, for example) on which the method for providing a speech service is performed may receive request information sent by the device.

In some alternative implementations of the present embodiment, the electronic device may further receive a status report message sent by the device, the status report message includes third event information and third status information, the third event information is used for indicating a third event occurring on the device when the device sends the status report message, and the third status information is used for indicating a status of the third event.

In some alternative implementations of the present embodiment, the request information sent by the device may further include a device identifier and an access token. The access token is a certificate sent by the server to the device in advance to allow access.

Step 404, analyzing the speech information, and determining a targeted device.

In the present embodiment, the electronic device (the server shown in FIG. 1, for example) on which the method for providing a speech service is performed may analyze the speech information and determine the targeted device.

Step 405, determining current event information of the targeted device and current status information corresponding to the current event information based on at least one of the first event information, the second event information or the third event information.

In the present embodiment, the electronic device (the server shown in FIG. 1, for example) on which the method for providing a speech service is performed may determine current event information of the targeted device and current status information corresponding to the current event information based on at least one of the first event information, the second event information or the third event information.

Here, the last event may be taken as the current event of the targeted device according to the occurrence sequence of the first event, the second event and the third event.

Step 406, generating response information based on the current event information of the targeted device, the current status information, the functional interface directory and the speech information.

In the present embodiment, the electronic device (the server shown in FIG. 1, for example) on which the method for providing a speech service is performed may generate the response information according to the current event information of the targeted device, the current status information, the functional interface directory and the speech information.

As an example, the speech information of the user is "Turn up the sound of the speaker". The volume value of the current sound is determined among a plurality of volume change events and a plurality of volume value status sent by the speaker to the server, and an operation instruction for calling a speaker control interface of the speaker to adjust the volume is generated.

It should be noted that the functions of the device may be accurately known according to the functional interface directory of the device. Current event information and current status information may be used to prevent a speech service response from being delayed due to the conflict between an operation instruction possibly generated for a speech service and an event currently occurring on the device.

Step 407, sending the response information to the targeted device.

In the present embodiment, the electronic device (the server shown in FIG. 1, for example) on which the method for providing a speech service is performed may send the response information to the targeted device for the targeted device to perform an operation indicated by the operation instruction.

As may be seen from FIG. 4, compared with the corresponding embodiment shown in FIG. 2, the flow 400 of the method for providing a speech service in the present embodiment highlights the steps of determining a targeted device and generating response information on the basis of the current event information and status information of the targeted device. Therefore, the solution described in the present embodiment may improve the accuracy and interaction efficiency of the speech service.

Figure 5:
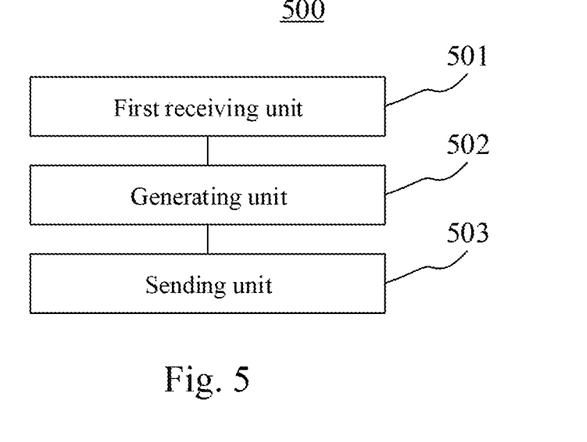
FIG. 5 is a structural schematic diagram of an embodiment of an apparatus for providing a speech service according to the present disclosure.

Further referring to FIG. 5, as an implementation of the method shown in the figures above, the present disclosure provides an embodiment of an apparatus for providing a speech service. The apparatus embodiments are corresponding to the method embodiments shown in FIG. 2, and the apparatus may be specifically applied to various electronic devices.

As shown in FIG. 5, the apparatus 500 for providing a speech service according to the present embodiment includes: a first receiving unit 501, a generating unit 502 and a sending unit 503. The first receiving unit 501 is configured for receiving request information sent by a device, the request information including first event information and speech information, the first event information used for indicating a first event occurring on the device when the device sends the request information, the first event information including speech input event information used for instructing a user to input the speech information. The generating unit 502 is configured for generating response information including an operation instruction for a targeted device on the basis of the first event information and the speech information. The sending unit 503 is configured for sending the response information to the targeted device for the targeted device to perform an operation indicated by the operation instruction In the present embodiment, the specific processing by the first receiving unit 501, the generating unit 502 and the sending unit 503 and the technical effects brought thereby may be described by referring to the steps 201, 202 and 203 in corresponding embodiment in FIG. 2, and thus will not be repeated here.

In some alternative implementations of the present embodiment, the apparatus 500 may further include: a second receiving unit (not shown), configured for receiving a response channel establishing request sent by the device, wherein the response channel establishing request is used to request establishing a channel for returning response information to a terminal device and maintaining the established response channel in a connected state; and a third receiving unit (not shown), configured for receiving second event information and second status information sent by the device, wherein the second event information is used for indicating a second event occurring on the device when the device sends the response channel establishing request, and the second status information is used for indicating a status of the second event.

In some alternative implementations of the present embodiment, the apparatus may further include: a fourth receiving unit (not shown), configured for receiving a functional interface directory sent by the device, wherein the functional interface directory includes an identifier of at least one of following operation interfaces: a speech input interface, a speech output interface, a speaker control interface, an audio play control interface, an alarm clock setting interface or a screen display interface; and a storage unit (not shown), configured for storing the functional interface directory and an identifier of the device sending the functional interface directory accordingly.

In some alternative implementations of the present embodiment, the apparatus may further include: a fifth receiving unit (not shown), configured for receiving a status report message sent by the device, the status report message including third event information and third status information, wherein the third event information is used for indicating a third event occurring on the device when the device sends the status report message, and the third status information is used for indicating a status of the third event.

In some alternative implementations of the present embodiment, the request information may further include first status information used for indicating a status of the first event; and the generating unit 502 may be further configured for: analyzing the speech information, and determining the targeted device; determining current event information of the targeted device and current status information corresponding to the current event information based on at least one of the first event information, the second event information or the third event information; and generating the response information according to the current event information of the targeted device, the current status information, the functional interface directory and the speech information.

In some alternative implementations of the present embodiment, the response information may further include to-be-played audio information, and the operation instruction includes an audio play instruction for playing the to-be-played audio information; and the sending unit 503 may be further configured for: sending the to-be-played audio information and the audio play instruction to the targeted device for the targeted device to call a speech output interface to play the to-be-played audio information according to the audio play instruction.

In some alternative implementations of the present embodiment, the response information may further include to-be-displayed view information, and the operation instruction may further include a view drawing instruction for drawing the to-be-displayed view information, wherein the view information includes at least one of the following: an image, a webpage or a video; and the sending unit 503 may be further configured for: sending the to-be-displayed view information and the view drawing instruction to the targeted device for the targeted device to call a screen display interface to draw and display the to-be-displayed view information according to the view drawing instruction.

It should be noted that, the implementation details and technical effects of each unit in the apparatus for providing a speech service as provided in the present embodiment may be described by referring to other embodiments in the present disclosure, and thus will not be repeated here.

Figure 6:
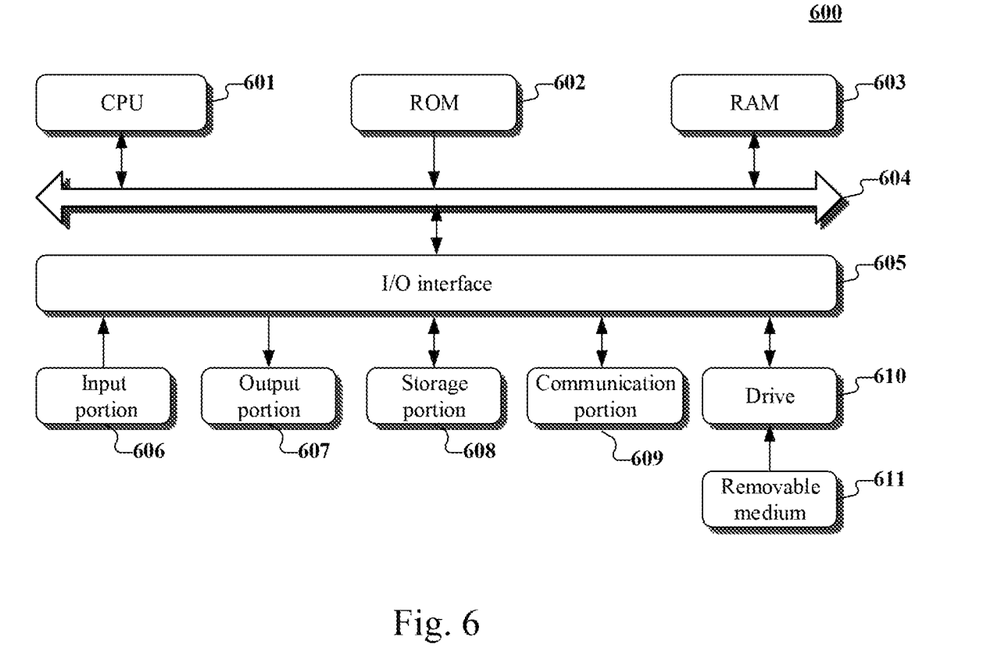
FIG. 6 is a structural schematic diagram of a computer system adapted to implement a server of the embodiments of the present disclosure.

Referring to FIG. 6, a structural schematic diagram of a computer system 600 adapted to implement a server of the embodiments of the present disclosure is shown. The server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first receiving unit, a generating unit, and a sending unit, where the names of these units do not in some cases constitute a limitation to such units or modules themselves. For example, the first receiving unit may also be described as "a unit for receiving request information sent by a device".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: receiving request information sent by a device, the request information comprising first event information and speech information, the first event information used for indicating a first event occurring on the device when the device sends the request information, the first event information comprising speech input event information used for instructing a user to input the speech information; generating response information comprising an operation instruction for a targeted device on the basis of the first event information and the speech information; and sending the response information to the targeted device for the targeted device to perform an operation indicated by the operation instruction.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for providing a speech service, comprising:
receiving request information sent by a device, the request information comprising first event information, second event information, third event information and speech information, wherein the first event information is used for indicating a first event occurring on the device when the device sends the request information to locate a function to be enabled according to the first event information, the first event information comprising speech input event information used for instructing a user to input the speech information, the second event information is used for indicating a second event occurring on the device when the device sends the response channel establishing request, and the third event information is used for indicating a third event occurring on the device when the device sends a status report message;
analyzing the speech information, and determining a targeted device;
determining current event information of the targeted device and current status information corresponding to the current event information based on the first event information, the second event information or the third event information;
generating response information according to the current event information of the targeted device, the current status information, a functional interface directory and the speech information; and
sending the response information to the targeted device for the targeted device to perform an operation indicated by the operation instruction.

2. The method according to claim 1, wherein, before receiving request information sent by a device, the method further comprises:
- receiving a response channel establishing request sent by the device, wherein the response channel establishing request is used to request establishing a channel for returning response information to a terminal device and maintaining the established response channel in a connected state; and
- receiving the second event information and first status information sent by the device, wherein the first status information is used for indicating a status of the first event.

3. The method according to claim 2, wherein, before receiving request information sent by a device, the method further comprises:
- receiving the functional interface directory sent by the device, wherein the functional interface directory comprises an identifier of at least one of following operation interfaces: a speech input interface, a speech output interface, a speaker control interface, an audio play control interface, an alarm clock setting interface or a screen display interface; and
- storing the functional interface directory and an identifier of the device sending the functional interface directory accordingly.

4. The method according to claim 3, wherein, before generating response information comprising an operation instruction for a targeted device on the basis of the first event information and the speech information, the method further comprises:
- receiving the status report message sent by the device, the status report message comprising the third event information and second status information, wherein the second status information is used for indicating a status of the second event.

5. The method according to claim 4, wherein the request information further comprises third status information used for indicating a status of the first event.

6. The method according to claim 1, wherein the response information further comprises to-be-played audio information, and the operation instruction comprises an audio play instruction for playing the to-be-played audio information; and
- the sending the response information to the targeted device for the targeted device to perform an operation indicated by the operation instruction comprises:
- sending the to-be-played audio information and the audio play instruction to the targeted device for the targeted device to call a speech output interface to play the to-be-played audio information according to the audio play instruction.

7. The method according to claim 6, wherein the response information further comprises to-be-displayed view information, and the operation instruction further comprises a view drawing instruction for drawing the to-be-displayed view information, wherein the view information comprises at least one of the following: an image, a webpage or a video; and
- the sending the response information to the targeted device for the targeted device to perform an operation indicated by the operation instruction further comprises:
- sending the to-be-displayed view information and the view drawing instruction to the targeted device for the targeted device to call a screen display interface to draw and display the to-be-displayed view information according to the view drawing instruction.

8. An apparatus for providing a speech service, comprising:
- at least one processor; and
- a memory storing instructions, the instructions when executed by the at least one processor, cause the at least one processor to perform operations, the operations comprising:
- receiving request information sent by a device, the request information comprising first event information, second event information, third event information and speech information, wherein the first event information is used for indicating a first event occurring on the device when the device sends the request information to locate a function to be enabled according to the first event information, the first event information comprising speech input event information used for instructing a user to input the speech information, the second event information is used for indicating a second event occurring on the device when the device sends the response channel establishing request, and the third event information is used for indicating a third event occurring on the device when the device sends a status report message;
- analyzing the speech information, and determining a targeted device;
- determining current event information of the targeted device and current status information corresponding to the current event information based on the first event information, the second event information or the third event information;
- generating response information according to the current event information of the targeted device, the current status information, a functional interface directory and the speech information; and
- sending the response information to the targeted device for the targeted device to perform an operation indicated by the operation instruction.

9. The apparatus according to claim 8, the operations further comprising:
- receiving a response channel establishing request sent by the device, wherein the response channel establishing request is used to request establishing a channel for returning response information to a terminal device and maintaining the established response channel in a connected state; and
- receiving the second event information and first status information sent by the device, wherein the first status information is used for indicating a status of the first event.

10. The apparatus according to claim 9, the operations further comprising:
- receiving the functional interface directory sent by the device, wherein the functional interface directory comprises an identifier of at least one of following operation interfaces: a speech input interface, a speech output interface, a speaker control interface, an audio play control interface, an alarm clock setting interface or a screen display interface; and
- storing the functional interface directory and an identifier of the device sending the functional interface directory accordingly.

11. The apparatus according to claim 10, the operations further comprising:
- receiving the status report message sent by the device, the status report message comprising the third event information and second status information, wherein the second status information is used for indicating a status of the second event.

12. The apparatus according to claim 11, wherein the request information further comprises third status information used for indicating a status of the first event.

13. The apparatus according to claim 8, wherein the response information further comprises to-be-played audio information, and the operation instruction comprises an audio play instruction for playing the to-be-played audio information; and
the sending the response information to the targeted device for the targeted device to perform an operation indicated by the operation instruction comprises:
sending the to-be-played audio information and the audio play instruction to the targeted device for the targeted device to call a speech output interface to play the to-be-played audio information according to the audio play instruction.

14. The apparatus according to claim 13, wherein the response information further comprises to-be-displayed view information, and the operation instruction further comprises a view drawing instruction for drawing the to-be-displayed view information, wherein the view information comprises at least one of the following: an image, a webpage or a video; and
the sending the response information to the targeted device for the targeted device to perform an operation indicated by the operation instruction further comprises:
sending the to-be-displayed view information and the view drawing instruction to the targeted device for the targeted device to call a screen display interface to draw and display the to-be-displayed view information according to the view drawing instruction.

15. A non-transitory computer storage medium storing a computer program, the computer program when executed by one or more processors, causes the one or more processors to perform operations, the operations comprising:
receiving request information sent by a device, the request information comprising first event information, second event information, third event information and speech information, wherein the first event information is used for indicating a first event occurring on the device when the device sends the request information to locate a function to be enabled according to the first event information, the first event information comprising speech input event information used for instructing a user to input the speech information, the second event information is used for indicating a second event occurring on the device when the device sends the response channel establishing request, and the third event information is used for indicating a third event occurring on the device when the device sends a status report message;
analyzing the speech information, and determining a targeted device;
determining current event information of the targeted device and current status information corresponding to the current event information based on the first event information, the second event information or the third event information;
generating response information according to the current event information of the targeted device, the current status information, a functional interface directory and the speech information; and
sending the response information to the targeted device for the targeted device to perform an operation indicated by the operation instruction.

* * * * *

UNITED STATES PATENT AND TRADEMARK OFFICE
CERTIFICATE OF CORRECTION

PATENT NO. : 11,360,737 B2
APPLICATION NO. : 16/028114
DATED : June 14, 2022
INVENTOR(S) : Jianliang Zhou It is certified that error appears in the above-identified patent and that said Letters Patent is hereby corrected as shown below:

On the Title Page

Item (73) Assignee: "BAIDU ONLINE NETWORK TECHNOLOGY (BEIJING) CO., LTD., Beijing (CN)"

Should read -- BAIDU ONLINE NETWORK TECHNOLOGY (BEIJING) CO., LTD., Beijing CN and SHANGHAI XIAODU TECHNOLOGY CO. LTD., Shanghai (CN) --

Signed and Sealed this
Thirteenth Day of February, 2024

Katherine Kelly Vidal
*Director of the United States Patent and Trademark Office*